United States Patent [19]
Khalil et al.

[11] Patent Number: 5,949,872
[45] Date of Patent: Sep. 7, 1999

[54] SS7 ACCESS ARCHITECTURE

[75] Inventors: Anis Khalil; Lily C. Su, both of Plano, Tex.; Tim Molinaro, Herndon, Va.

[73] Assignee: MCI Communications Corporation, Washington, D.C.

[21] Appl. No.: 08/622,859

[22] Filed: Mar. 29, 1996

[51] Int. Cl.[6] .............................. H04M 3/42; H04M 7/00; H04M 3/00

[52] U.S. Cl. ...................... 379/230; 379/207; 379/220; 379/279; 379/244

[58] Field of Search .................... 379/67, 88, 89, 379/207, 230, 220, 279

[56] References Cited

U.S. PATENT DOCUMENTS

| | | | |
|---|---|---|---|
| 5,086,460 | 2/1992 | Ash et al. | 379/221 |
| 5,282,244 | 1/1994 | Fuller et al. | 379/230 |
| 5,329,308 | 7/1994 | Binns et al. | 348/14 |
| 5,353,331 | 10/1994 | Emery et al. | 379/58 |
| 5,438,568 | 8/1995 | Weisser, Jr. | 370/60 |
| 5,497,414 | 3/1996 | Bartholomew | 379/142 |
| 5,517,562 | 5/1996 | McConnel | 379/207 |
| 5,566,179 | 10/1996 | Kobayashi et al. | 370/85.15 |
| 5,566,235 | 10/1996 | Hetz | 379/201 |

*Primary Examiner*—Fan S. Tsang
*Assistant Examiner*—Allan Hoosain

[57] ABSTRACT

A CCS network architecture is provided that segregates traffic. The CCS network includes a first network dedicated to a first type of traffic and a second network dedicated to a second type of traffic. Internal switches, foreign mated STP pairs, and foreign switches are provided with dual-homing features.

22 Claims, 2 Drawing Sheets

SS7 ACCESS ARCHITECTURE

BACKGROUND OF THE INVENTION

1. Field of the Invention

The present invention relates generally to common channel signaling (CCS), and more specifically is directed toward topologies of Signaling System #7 (SS7) networks.

2. Related Art

In conventional common channel signaling networks (e.g., SS7), mated signaling transfer point (STP) pairs provide an interface to the switches of a long distance carrier and the switches of regional bell operating companies (RBOCs)/local exchange companies (LECs). These standard interfaces are used in the transport of integrated services digital network user part (ISUP) and transaction capabilities application part (TCAP) messages.

FIG. 1 illustrates a conventional topology of a SS7 network. This conventional topology includes various connections that are termed A-links, B-links, C-links, and D-links. In this description, A-links are the connections between a switch and an STP, B-links are the connections between STPs of a single carrier, C-links are the connections between individual STPs in a mated pair, and D-links are the connection between a carrier's STP and a foreign STP.

Returning to FIG. 1, SS7 network 100 comprises a plurality of mated STP pairs 102a–102e that are interconnected by a mesh of B-links 116. This mesh network provides increased survivability due to failures in one or more B-links 116. At the originating and terminating ends, survivability is increased by the connection of a single switch to each STP in a mated pair of STPs 102a–102e. For example, a switch 108a, 108b of a long-distance carrier is connected to mated STP pair 102a and 102b, respectively via A-links 118. Similarly, LEC switch 106 is connected to LEC mated STP pair 104 via A-links 112.

Through this topology, the interconnection between LEC switch 106 and long-distance carrier switch 108 via A-links 112 and 118, D-links 114, and B-links 116 is protected against any failure in a single STP in a mated STP pair. Survivability is a critical feature of common channel signaling network 100. However, it is not the only consideration in estimating the value of common channel signaling network 100. Consideration must be given not only to the efficiency of the network in processing messages but also to the ease at which network expansion can occur.

Generally, network expansion can include expansion of existing STPs or the addition of new mated STP pairs. If mated STP pairs are sought to be added, some of the SS7 traffic on existing mated STP pairs 102a–102e require migration to different mated STP pairs. In equalizing the load between mated STP pairs, all of the mated STP pairs could be affected (e.g., updating of each of their existing databases). These provisioning and maintenance actions can detract from the performance of common channel signaling network 100.

SUMMARY OF THE INVENTION

The present invention addresses the problems identified above by providing an improved common channel signaling (CCS) network topology having increased flexibility and survivability. This improved CCS network comprises a first and a second network that is dedicated to specific types of traffic.

The first network is formed by a first plurality of mated signal transfer point pairs. This first plurality of mated signal transfer point pairs are connected by a first plurality of links into a mesh architecture. In one embodiment, the first network transports CCS messages for internal traffic that terminate on internal switches connected to the first network.

Similarly, the second network is formed by a second plurality of mated signal transfer point pairs. This second plurality of mated signal transfer point pairs are connected by a second plurality of links into a mesh architecture. Additionally, the second plurality of mated signal transfer point pairs are further connected to the first plurality of mated signal transfer point pairs by a third plurality of links. In one embodiment, the second network transports CCS messages for external traffic that terminate on external switches connected to the second network via foreign mated STP pairs.

In addition to the basic connectivity defined above, a dual-homing feature is also provided. The term dual-homing generally refers to the connection between a switch (or a foreign mated STP pair) to two distinct mated STP pairs. With respect to the internal switches, each internal switch is connected to a mated STP pair in the first network and a mated STP pair in the second network. With respect to the foreign mated STP pairs, each foreign mated STP pair is optionally connected to two distinct mated STP pairs in the second network. Generally, this dual homing feature ensures that connectivity is retained despite the failure of any single mated STP pair in either the first or the second network.

Finally, in one embodiment, the functionality of the mated STP pairs in the first network is a subset of the functionality of the mated STP pairs of the second network. This segregation of functionality allows the mated STP pairs in the first network to be based upon a different software release from the mated STP pairs of the second network. Alternatively, the mated STP pairs could be purchased from a different manufacturer. In this manner, the probability of a cascading software error occurring within the entire CCS network is reduced.

BRIEF DESCRIPTION OF THE FIGURES

The foregoing and other features and advantages of the invention will be apparent from the following, more particular description of a preferred embodiment of the invention, as illustrated in the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

In recent years, the signaling system #7 (SS7) network port requirements have grown substantially. This increased demand has two sources. The first source is the increase in the internal traffic handled by the internal switches of the long-distance carrier (e.g., MCI Communications Corporation). Internal traffic includes traffic (e.g., dedicated access lines) that terminates at the internal switches or at point codes associated with the long-distance company.

The second source is the increase in the external traffic in the network. External traffic includes traffic that terminates outside of the long-distance carrier's network. The most common example of external traffic is the traffic that terminates at a regional bell operating company (RBOC)/local exchange company (LEC). Other examples of external traffic are based upon the provision of new services that require SS7 network transport facilities. Examples of these new services include the virtual signaling network (VSNET) which provides call setup from an LEC to a reseller of long-distance service, METRO which provides local service by a long-distance carrier (e.g., MCI Telecommunications Corp.), and PCS which provides wireless services. As these new services are continually introduced and expanded, the provisioning of the SS7 network necessarily becomes a dynamic process.

Further effects of the provisioning of these new services are evident in the functionality of the SS7 network. Specifically, to support the new external services, the signaling transfer points (STPs) in the SS7 network must be configured to handle enhanced processing functions. These enhanced processing functions are in addition to the processing functions required for support of internal traffic. Examples of these enhanced functions include billing, gateway screening, and global title translation capability. The gateway screening function validates whether or not the message associated with the external traffic should be allowed to be transported on the SS7 network. The global title translation function, on the other hand, translates an address supplied by a requesting application to a proper routing code (e.g., RBOC/LEC digits to digits recognized by the long-distance company).

In summary, the support of external traffic introduces numerous demands on the SS7 network. As noted above, the volume of external traffic can change rapidly due to the introduction of new services or a rapid rise in the demand for existing services. Moreover, the support of external traffic requires enhanced functions within the STPs that otherwise might not exist. In comparison, the support of internal traffic is relatively simple. Volume increases are much more predictable and functionality changes are infrequent.

Figure 1:
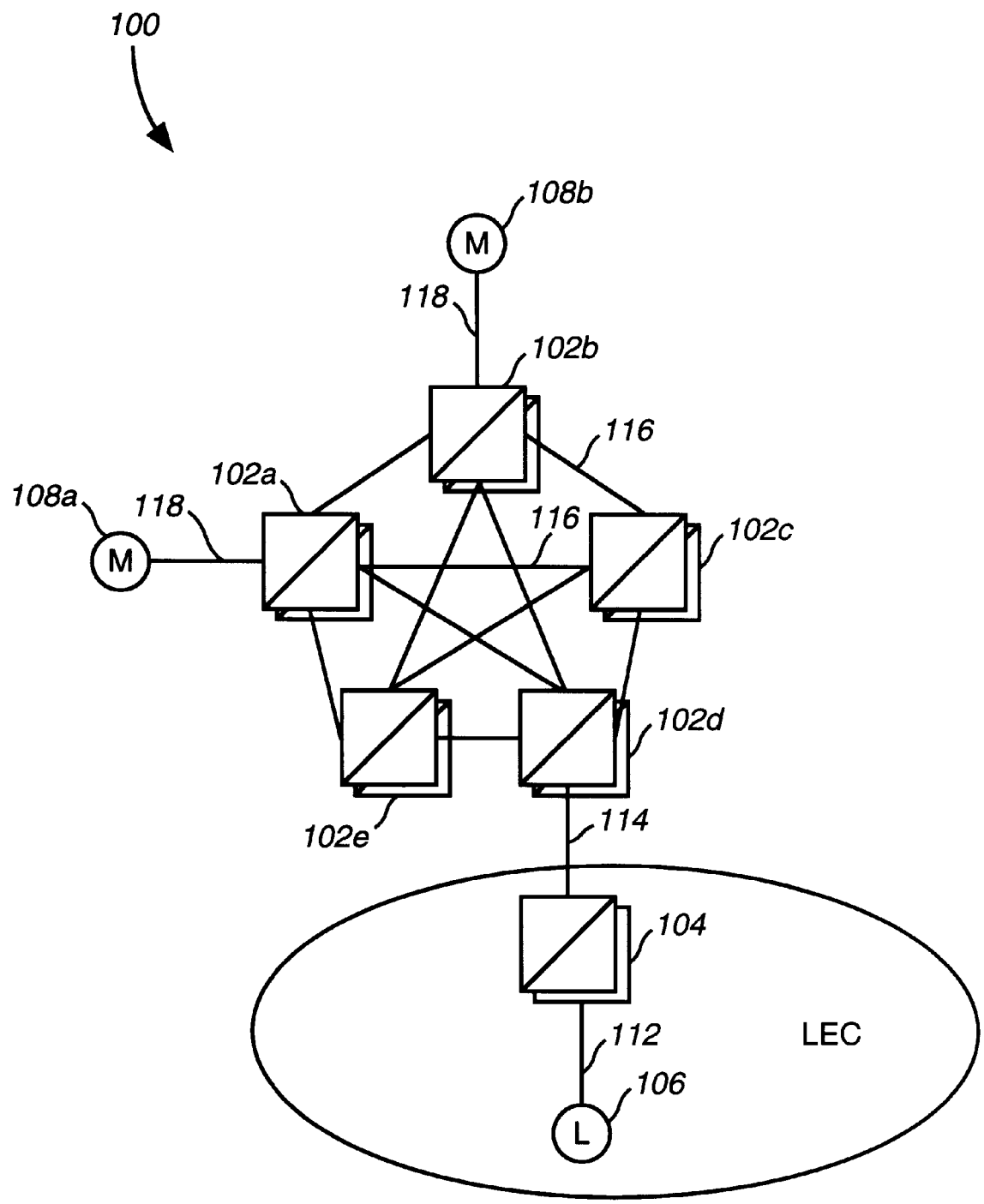
FIG. 1 illustrates a conventional topology of a SS7 network.
Figure 2:
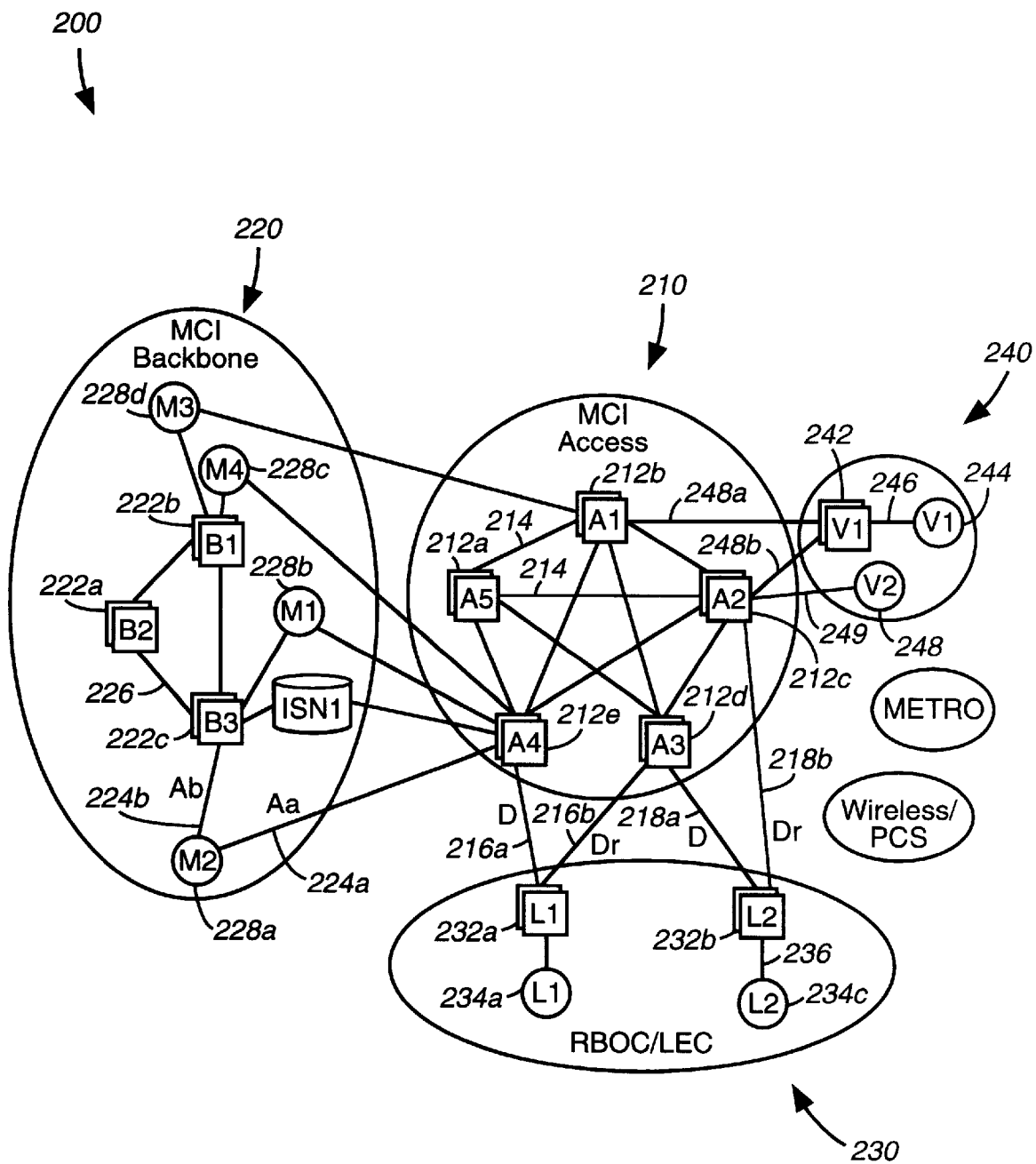
FIG. 2 illustrates a SS7 network topology according to the present invention.

In conventional SS7 networks 100, both internal and external traffic are supported by a single set of mated STP pairs 102a–102e. In large part, the expansion of the capacity and functionality within the SS7 network is driven by the potentially volatile demands of the external traffic. The present invention, addresses this expansion problem through the creation of a unique topology of the SS7 network. This topology addresses the functional requirements of both internal and external traffic. Moreover, this topology expands upon the survivability of the SS7 network in response to link or node (i.e., STP) failures. FIG. 2 illustrates a SS7 network topology according to the present invention. Generally, SS7 network 200 comprises an access network 210 and a backbone network 220. Access network 210 further comprises a plurality (e.g., 5) of mated STP pairs 212a–212e that are connected in a mesh architecture by a plurality of B-links 214. Similarly, backbone network further comprises a plurality (e.g., 3) of mated STP pairs 222a–222c that are connected in a mesh architecture by a plurality of B-links 226. Mated STP pairs 222a–222c of backbone network 220 are further connected (i.e., mesh connectivity) to mated STP pairs 212a–212e of access network 210 via a plurality of D-links (not shown).

Access network 210 is dedicated to external traffic while backbone network 220 is dedicated to internal traffic. With respect to external traffic, mated STP pairs 212a–212e in access network 210 can be connected to either a foreign mated STP pair 232a, 232b, 242 or to a foreign switch 248.

In the VSNET example of FIG. 2, a private network customer is connected directly to mated STP pair 212c via A-link 249. Although not shown, foreign switch 248 can be dual-homed to two mated STP pairs in access network 210.

In combination, access network 210 and backbone network 220 represent a migration/reconfiguration with respect to conventional SS7 network 100. This migration process can include the following steps which provide a seamless method for reconfiguring an existing SS7 network 100. First, a backbone network 220 is provisioned. Since backbone network 220 is dedicated to internal traffic, it is sized based upon the current and anticipated level of internal traffic on SS7 network 100. This sizing dictates the number of mated STP pairs 222a–222c, the number of B-links 226 connecting mated STP pairs 222a–222c, the number of C-links (not shown) connecting individual STPs within mated STP pairs 222a–222c, and the number of D-links (not shown) connecting mated STP pairs 222a–222c to mated STP pairs 212a–212e.

Next, A-links are provisioned from a single internal switch 228a–228d to one of mated STP pair 222a–222c. For example, A-link 224b is provisioned for connection between internal switch 228a and mated STP pair 222c. It should be noted that A-link 224a connecting internal switch 228a to mated STP pair 212e in access network 210 is already in place.

In combination, A-links 224a, 224b provide a dual-homing feature between internal switch 228a and both access network 210 and backbone network 220. Unlike typical redundant connections seen in automated protection systems, both of A-links 224a, 224b are transporting SS7 traffic. Specifically, messaging for internal traffic is transported over A-link 224b while messaging for external traffic is transported over A-link 224a. As will be described in greater detail below, this dual-homing feature protects network disruption based upon a failure of any single mated STP pair 212a–212e, 222a–222c.

As a further step of reconfiguring SS7 network 100, restoration D-links 216b, 218b, and 248b are provisioned. In combination with existing D-links 216a, 218a, and 248a, restoration D-links 216b, 218b, and 248b provide a dual-homing feature between foreign mated STP pairs 232a, 232b, and 242 with mated STP pairs in access network 210. As noted above, foreign switch 248 can also be dual-homed with two mated STP pairs in access network 210. In this manner, each foreign mated STP pair 232a, 232b, 242 or foreign switch 248 will retain connectivity to access network 210 despite the failure of any single mated STP pair 212a–212e in access network 210.

After the mated STP pairs, A-links, B-links, C-links, and D-links have been provisioned as described above, the internal traffic on SS7 network 100 can be migrated over to backbone network 220. This process generally includes the step of updating routing databases within individual STPs.

At this point, it should be noted that this provisioning/migration involved only the addition of new facilities (i.e., STPs and A, B, C and D links). No rerouting of existing facilities is required. For example, A-link 224a that connected internal switch 228a to mated STP pair 212e, was not reconfigured to connect to mated STP pair 222c. Instead, A-link 224b was added to provide a dual-homing feature for internal switch 228a. By minimizing the reconfiguration, the potential disruption in the overall migration plan is minimized.

Having thus described the general topology of SS7 network 200, the features, functionality, and benefits of the new topology are now described. One primary benefit of this new topology is the processing efficiency gain that is achieved through the separation of internal and external traffic. As noted above, mated STP pairs 212a–212e on access network 210 are equipped with added processing intelligence to handle enhanced functions such as billing, gateway screening, and global title translation. Implementing these functions, however, takes up more processing resources. Accordingly, fewer number of links can be assigned to those processors that are required to perform those functions.

In comparison, mated STP pairs 222a–222c on backbone network 220 are not required to support those enhanced functions, thereby allowing more links to be assigned to those processors. In general, the separation of SS7 network 200 to meet the different signaling requirements of internal and external traffic, allows the overall system resources to be allocated more efficiently.

A further benefit of SS7 network 200 is the dual-homing feature. Dual-homing is provided for both internal switches 228a–228d, foreign mated STP pairs 232a, 232b, 242, and foreign switches 248. For foreign mated STP pairs 232a, 232b, 242 and foreign switch 248, the dual-homing feature preserves connectivity to access network 210 in case of a failure to a single mated STP pair 212a–212e. For internal switches 228a–228d, on the other hand, the dual-homing feature preserves connectivity to one of either the access network 210 or backbone network 220 in case of a failure to a single mated STP pair 212a–212e or 222a–222c.

The following examples illustrate this survivability feature. The first illustration concerns the connection of foreign mated STP pairs 232a, 232b, 242 to internal switches 222a–222c. For example, consider the connection between foreign mated STP pair 232a(L1) and internal switch 228a (M2). In this connection, a SS7 message could follow the path from foreign mated STP pair 232a(L1) to mated STP pair 212e (A4) via D-link 216a, and then to internal switch 228a (M2) via A-link 224a. For this discussion, this path is represented by L1-A4-M2. If mated STP pair 212e (A4) fails, however, a message from L1 to M2 could now be routed via a different access pair. Specifically, a message could be routed on the path L1-A3-B3-M2. If access network 210 was configured in a similar manner to conventional SS7 network 100, a failure of mated STP pair 212e would isolate foreign mated STP pair 232a.

Another example is provided with respect to the connection between two of the foreign mated STP pairs 232a, 232b, and 242. For example, consider the connection between foreign mated STP pair 242 associated with VSNET service 240 and foreign mated STP pair 232a associated with RBOC/LEC 230. In this example, a standard connection can follow the path of V1-A1-A4-L1. This connection is protected from failure in one or both of mated STP pairs A1 and A4. If A1 fails, the connection can be rerouted to the path V1-A2-A4-L1. If both A1 and A4 fail, the connection can be rerouted to the path V1-A2-A3-L1. As this example illustrates, the dual homing feature of SS7 network 200 protects against one or more mated STP failures. This improves upon conventional solutions that protect against one STP failure within a single mated STP pair.

In addition to the protection from mated STP failure, SS7 network 200 can also adjust to failures on a network scale. One aspect of network survivability is based upon the relative functionality supported by access network 210 relative to backbone network 220. As noted above, access network 210 requires additional functionality such as billing, gateway screening, and global title translation to support external traffic. Each of these functions are in excess to the basic functionality supported in backbone network 220 which carries only internal traffic.

This separation of traffic, and thus functionality, allows for separate configurations in the mated STP pairs 212a–212e of access network 210 and mated STP pairs 222a–222c of backbone network 210. Specifically, mated STP pairs 212a–212e of access network 210 can be configured with an advanced software release relative to mated STP pairs 222a–222c of backbone network 220. This segregation of the network based upon the software functionality increases the probability that SS7 network 200 will survive a catastrophic software failure. For example, consider the possibility that the latest release of software that is installed in mated STP pairs 212a–212e causes a software failure that cascades through access network 210. The spread of this cascading failure into backbone network 220 could be halted based upon the different software release in backbone network 220. In this manner, the messaging handled by backbone network 220 is preserved. In other embodiments, mated STP pairs 222a–222c could be purchased from a separate manufacture, thereby ensuring that a latent software defect will not exist in each mated STP pair 212a–212e and 222a–222c of SS7 network 200.

Another type of network restoration is provided by the existence of dual-homing A-links (e.g., 224a) between each of internal switches 228a–228d and access network 210. In this scenario, assume that each of mated STP pairs 222a–222c of backbone network 220 have failed. The transport of messaging for internal traffic is therefore disrupted. In this case, messaging for internal traffic could be rerouted over the spare capacity of the dual-homed A-links connecting internal switches 228a–228d to access network 210. For example, messaging that was previously routed on the connection M2-B3-B1-M4 could be rerouted to M2-A4-M4. Network level survivability is thereby achieved.

As described above, SS7 network 200 provides increasing efficiency, flexibility and survivability in carrying SS7 traffic. While this description has focused upon the SS7 network of a long-distance carrier, the teachings of the present invention are applicable to any generic segregation of traffic within a common channel signaling network. It will therefore be understood by those skilled in the relevant art that various changes in form and details may be made therein without departing from the spirit and scope of the invention.

What is claimed is:

1. A common channel signaling network and, comprising:
   a first network formed by a first plurality of mated signal transfer point (STP) pairs, said first plurality of mated (STP) pairs being connected by a first plurality of links, said first network operating to transport messages for internal traffic that terminates on internal switches that are connected to said first network;
   a second network formed by a second plurality of mated (STP) pairs, said second plurality of mated (STP) pairs being connected by a second plurality of links, said second network operating to transport messages for external traffic that terminates on external switches that are connected to said second network;
   wherein said internal switches are dual-homed to both said first network and said second network,
   wherein said mated (STP) pairs of said first network are connected to said mated (STP) pairs of said second network by a third plurality of links,
   wherein said first plurality of mated (STP) pairs are optimized to process said internal traffic messages, and said second plurality of mated (STP) pairs are optimized to process said external traffic messages.

2. The network of claim 1, wherein foreign mated (STP) pairs are dual-homed to two of said mated signal transfer point pairs of said second network.

3. The network of claim 1, wherein foreign switches are dual-homed to two of said mated (STP) pairs of said second network.

4. The network of claim 1, wherein said first plurality of mated (STP) pairs are controlled by a first software system and said second plurality of mated (STP) pairs are controlled by a second software system, said first software system and said second software system being distinct.

5. The common channel signaling network of claim 1, wherein the number of said first plurality of mated (STP) pairs is based on the volume of said internal traffic without considering the volume of said external traffic.

6. The common channel signaling network of claim 1, wherein the number of said second plurality of mated (STP) pairs is based on the volume of said external traffic without considering the volume of said internal traffic.

7. The common channel signal network of claim 1, wherein said optimization of said first plurality of mated (STP) pairs comprises limiting the functionality in each of said first plurality of mated (STP) pairs to a plurality of basic functions associated with said internal traffic.

8. The common channel signal network of claim 1, wherein said optimization of said second plurality of mated (STP) pairs comprises loading each of said second plurality of mated (STP) pairs with a plurality of enhanced functions associated with said external traffic.

9. The common channel signaling network of claim 8 wherein said plurality of enhanced functions comprises one of billing capability, gateway screening capability, and global title translation capability.

10. The common channel signaling network of claim 1 wherein said first and second plurality of mated STP pairs comprise all the mated STP pairs in each of said respective first and second networks.

11. A method for protecting a common channel signaling network from a software failure, comprising the steps of:
    (1) routing messages for internal traffic on a first network formed by a first plurality of mated signal transfer point (STP) pairs, said first plurality of mated (STP) pairs being connected by a first plurality of links, wherein said internal traffic terminates on internal switches that are connected to said first network; and
    (2) routing messages for external traffic on a second network formed by a second plurality of mated (STP) pairs, said second plurality of mated (STP) pairs being connected by a second plurality of links, wherein said external traffic terminates on external switches that are connected to said second network,
        wherein said mated (STP) pairs of said first network are connected to said mated (STP) pairs of said second network by a third plurality of links,
        wherein said first plurality of mated (STP) pairs are controlled by a first software system optimized for said internal traffic, and said second plurality of mated (STP) pairs are controlled by a second software system optimized for said external traffic, and
        wherein said internal switches are dual-homed to both said first network and said second network.

12. The method of claim 11 wherein said first and second plurality of mated STP pairs comprise all the mated STP pairs in each of said respective first and second networks.

13. A common channel signaling method, comprising the steps of:
    (1) routing messages for internal traffic on a first network formed by a first plurality of mated signal transfer point (STP) pairs, said first plurality of mated (STP) pairs being connected by a first plurality of links, wherein said internal traffic terminates on internal switches that are connected to said first network; and
    (2) routing messages for external traffic on a second network formed by a second plurality of mated (STP) pairs, said second plurality of mated (STP) pairs being connected by a second plurality of links, wherein said external traffic terminates on external switches that are connected to said second network,
        wherein said mated (STP) pairs of said first network are connected to said mated (STP) pairs of said second network by a third plurality of links,
        wherein said first plurality of mated (STP) pairs are optimized to process said internal traffic messages, and said second plurality of mated (STP) pairs are optimized to process said external traffic messages, and
        wherein said internal switches are dual-homed to both said first network and said second network.

14. The common channel signaling method of claim 13, further comprising the step of sizing the first network based on the volume of said internal traffic without considering the volume of said external traffic.

15. The common channel signaling method of claim 13, further comprising the step of sizing the second network based on the volume of said external traffic without considering the volume of said internal traffic.

16. The common channel signaling method of claim 13, wherein said optimization of said first plurality of mated (STP) pairs comprises the step of limiting the functionality in each of said first plurality of mated (STP) pairs to a plurality of basic functions associated with said internal traffic.

17. The common channel signaling method of claim 13, wherein said optimization of said second plurality of mated (STP) pairs comprises the step of performing enhanced functions at said second plurality of mated (STP) pairs associated with said external traffic.

18. The common channel signaling method of claim 17, wherein said step of performing enhanced functions comprises the step of performing one of billing, gateway screening, and title translation for said external traffic.

19. The method of claim 13 wherein said first and second plurality of mated STP pairs comprise all the mated STP pairs in each of said respective first and second networks.

20. A common channel signaling network, comprising:
    a first network formed by a first plurality of mated signal transfer point (STP) pairs optimized to process internal traffic messages, said first plurality of mated STP pairs being connected by a first plurality of links, said first network operating to transport messages for internal traffic that terminates on internal dual-homed switches comprising a part of said first network and said first plurality comprising all the mated STP pairs in said first network;
    a second network formed by a second plurality of mated STP pairs optimized to process external traffic messages, said second plurality of mated STP pairs being connected by a second plurality of links, said second network operating to transport messages for external traffic that terminates on dual-horned external switches that are connected to said second network and said second plurality comprising all the mated STP pairs in said second network, wherein said internal dual-homed switches are dual-homed to both said first network and said second network; and a third plurality of links interconnecting said mated STP pairs of said first network to said mated STP pairs of said second network.

21. A common channel signaling method, comprising:

routing messages for internal traffic on a first network formed by a first plurality of mated signal transfer point (STP) pairs optimized to process internal traffic messages, said first plurality of mated STP pairs being connected by a first plurality of links, said first network operating to transport messages for internal traffic that terminates on internal dual-homed switches comprising a part of said first network and said first plurality comprising all the mated STP pairs in said first network; and routing messages for external traffic on a second network formed by a second plurality of mated STP pairs optimized to process external traffic messages, said second plurality of mated STP pairs being connected by a second plurality of links, said second network operating to transport messages for external traffic that terminates on dual-homed external switches that are connected to said second network and said second plurality comprising all the mated STP pairs in said second network, wherein a third plurality of links interconnects said mated STP pairs of said first network to said mated STP pairs of said second network and wherein said internal dual-homed switches are dual-honed to both said first network and said second network.

22. A method of maximizing common channel signaling processing in mated signal transfer point (STP) pairs comprising the steps of:

routing all transport messages for internal traffic that terminates on switches internal to a given network through a first set of functionally similar mated STP pairs; and routing all transport messages for external traffic that terminates on switches external to said given network through a second set of functionally similar mated STP pairs, wherein said internal switches are dual-horned to both said first and said second mated STP pairs.

* * * * *